(12) United States Patent
Hooghoudt et al.

(10) Patent No.: US 10,947,362 B2
(45) Date of Patent: *Mar. 16, 2021

(54) POLYMER DEGRADATION

(71) Applicant: Ioniqa Technologies B.V., Eindhoven (NL)

(72) Inventors: Tonnis Hooghoudt, Eindhoven (NL); Vincent Philippi, Eindhoven (NL); Marcel Vilaplana Artigas, Eindhoven (NL)

(73) Assignee: Ioniqa Techonolgies B.V.

( * ) Notice: Subject to any disclaimer, the term of this patent is extended or adjusted under 35 U.S.C. 154(b) by 14 days.

This patent is subject to a terminal disclaimer.

(21) Appl. No.: 16/418,696

(22) Filed: May 21, 2019

(65) Prior Publication Data
US 2019/0375910 A1 Dec. 12, 2019

Related U.S. Application Data

(63) Continuation of application No. 15/539,539, filed as application No. PCT/NL2015/050907 on Dec. 23, 2015, now Pat. No. 10,316,163.

(30) Foreign Application Priority Data

Dec. 23, 2014 (NL) .................................. 2014048
Dec. 23, 2014 (NL) .................................. 2014050

(51) Int. Cl.
*C08J 11/28* (2006.01)
*C08J 11/16* (2006.01)
*C08J 11/24* (2006.01)
*C08J 11/04* (2006.01)

(52) U.S. Cl.
CPC ................ *C08J 11/28* (2013.01); *C08J 11/04* (2013.01); *C08J 11/16* (2013.01); *C08J 11/24* (2013.01); *C08J 2367/02* (2013.01); *Y02W 30/62* (2015.05)

(58) Field of Classification Search
USPC .......................................................... 521/48
See application file for complete search history.

(56) References Cited

FOREIGN PATENT DOCUMENTS

WO 2014142661 A2 9/2014
WO 2014209117 A1 12/2014

OTHER PUBLICATIONS

International Search Report and Written Opinion by the International Search Authority for International Application No. PCT/NL2015/050907, dated Apr. 25, 2016 (9 pages).
International Preliminary Report on Patentability by the International Search Authority for International Application No. PCT/NL2015/050907, dated Jun. 27, 2017 (8 pages).
Dalaigh, "A Magnetic-Nanoparticle-Supported 4-N, N-Dialkylaminopyridine Catalyst: Excellent Reactivity Combined with Facile Catalyst Reovery and Recyclability", Angew, Chem (2007) 119, 4407-4410 DOI:10.1002/anie.200605216.

*Primary Examiner* — Terressa Boykin
(74) *Attorney, Agent, or Firm* — Husch Blackwell LLP

(57) ABSTRACT

The present invention is in the field of a method of degrading a polymer into oligomers and/or monomers in a solvent, using a catalyst, and a functionalized magnetic particle comprising a catalyst being capable of degrading the polymer into oligomers and/or monomers. The present method and particle provide a high selectivity and a high conversion ratio.

17 Claims, 3 Drawing Sheets

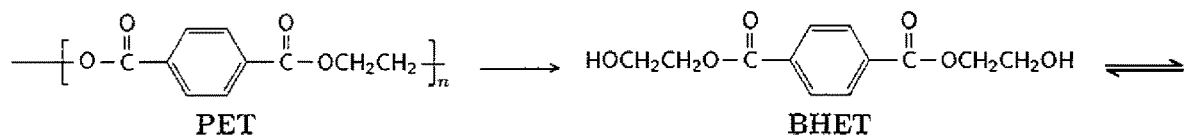
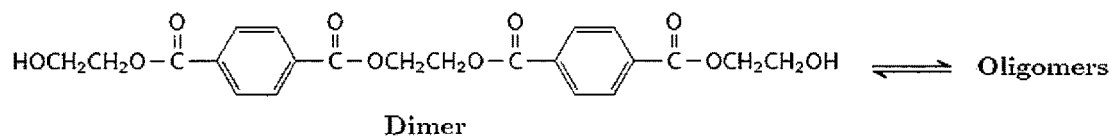
Fig. 1a
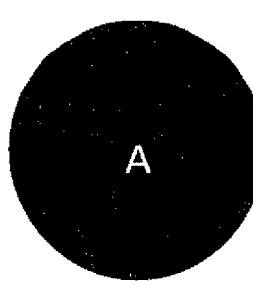
Fig. 1b
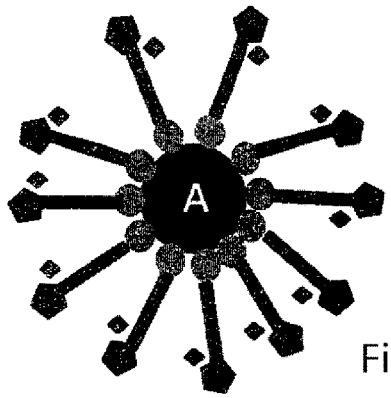
Fig. 1c
Fig. 1d
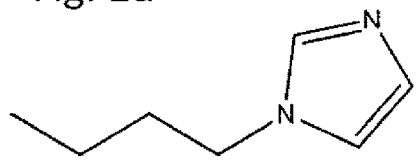
1-butylimidazole
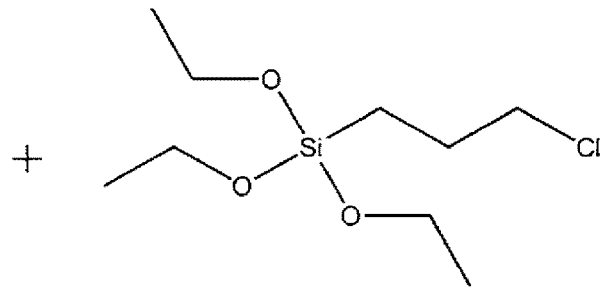
(3-chloropropyl)triethoxysilane
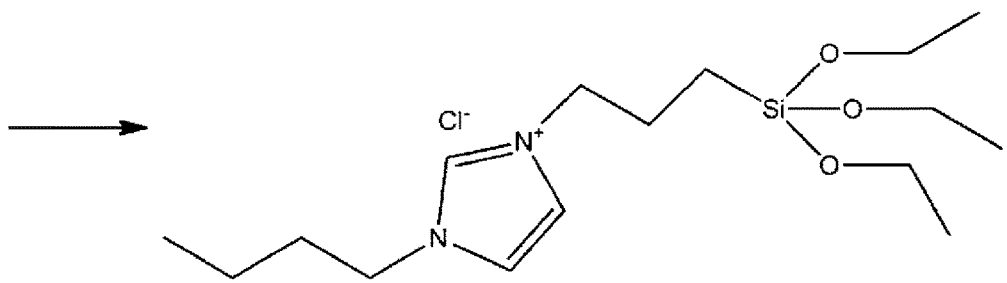
1-butyl-3-(3-(triethoxysilyl)propyl)-1$H$-imidazol-3-ium chloride

POLYMER DEGRADATION

CROSS-REFERENCE TO RELATED APPLICATIONS

This is a continuation of U.S. patent application Ser. No. 15/539,539 filed Jun. 23, 2017, which is a national stage of International Application No. PCT/NL2015/050907, filed Dec. 23, 2015, which claims the benefit of and priority to Netherlands Patent Application No. 2014048, filed Dec. 23, 2014 and Netherlands Patent Application No. 2014050, filed Dec. 23, 2014, all of which are incorporated herein by reference in their entireties.

FIELD OF THE INVENTION

The present invention is in the field of a method of degrading a polymer into oligomers and/or monomers in a solvent, using a catalyst, and a functionalized magnetic particle comprising a catalyst being capable of degrading the polymer into oligomers and/or monomers. The present method and particle provide a high selectivity and a high conversion ratio.

BACKGROUND OF THE INVENTION

With respect to degradation of used polymers (or plastics), typically present as a product or material, it is noted that in general this is hindered by lack of separation methods (e.g. separation of a first polymer from a second polymer, such as polyethylene (PE) and polypropylene (PP)). As a consequence a significant amount of used polymers is used as a fuel, which is burned.

It is noted that chemical recycling of polymers such as Polyethylene terephthalate (PET) is considered cost-efficient only applying relatively high capacity recycling lines of e.g. more than 50 ktons/year. Most likely such lines will only be combined with production sites of very large polymer producers. Several attempts of industrial magnitude to establish such chemical recycling plants have been made in the past but without resounding success. Even the promising chemical recycling in e.g. Japan has not become an industrial break through so far; there seem to be two main reasons therefore: first, a difficulty of consistent and continuous waste bottles sourcing in a required huge amount at one single site, and, at second, the steadily increased prices and price volatility of collected bottles. So despite huge amounts of PET produced on a yearly basis (>50.000 ktons) forming similar amounts of waste no economically feasible process has been introduced.

A further issue is that if a separation is (partly) successful, degradation into smaller building units still is difficult. Many methods or processes are not selective enough, that is a discrimination, shown by a reagent in competitive attack on two or more substrates or on two or more positions in the same substrate, is relatively low. It is typically quantitatively expressed by ratios of rate constants of the competing reactions, or by the decadic logarithms of such ratios. Further a conversion is too low; efficient conversion of reactants (polymers) to desired products (monomers or oligomers) without much wastage production in terms of side products is an issue. As a consequence a yield, being regarded as a product of selectivity times conversion, is too low as well.

A problem with a use of catalysts, especially free catalysts in a solvent, is that it is virtually impossible to recover the catalyst after a first usage. As catalysts are typically quite expensive, one would like to recover a catalyst, at least largely, and reuse the catalyst a second time and preferably many more times. A small waste of catalyst would be acceptable, if a waste is in the order of a few percent or less. In this respect Wang (in Wang et al, "Fe-containing magnetic ionic liquid as an effective catalyst for glycolysis of poly (ethylene terephthalate)", Cat. Comm. 11 (2010), pp. 763-767, and in Eur. Pol. J., Pergamon Press Oxford, vol. 45, no. 5, 1 May 2009, pp. 1535-1544), and Xueyuan Zhou et al. (in Pure and Applied Chemistry, Vol. 84, No. 3, 1 Jan. 2012, pp. 789-801) mention degradation of PET using a catalyst, without reusing the catalyst and with moderate results. The amount of catalyst used in these processes is relatively high (17-80 wt. %. catalyst per weight PET) and results are far from optimal.

Further it is in general considered a disadvantage to combine a catalyst to a support. Amongst others selectivity and conversion, as well as available catalyst are jeopardized. As such compared to non-combined catalyst typically more catalyst needs to be used in order to obtain similar results, and even then selectivity and conversion are still worse. In this respect Valkenberg et al. in "Immobilisation of ionic liquids on solid supports", Green Chemistry, 2002 (4), pp. 88-93, shows ionic liquids attached to solid supports, e.g. a metal oxide, such as $TiO_2$, $SiO_2$, $Al_2O_3$, etc. Lee in "Functionalized imidazolium salts for task-specific ionic liquids and their applications", Chem. Commun., 2006, pp. 1049-1063 mentions similar catalysts. Such relate to a two-phase system. The results of the catalytic activity tested are considered rather poor, apart from some exceptions, especially in terms of conversion and selectivity. Valkenberg, in table 3 shows a comparison between an Fe-IL in unsupported status and in supported status. For anisole the conversion drops from 90% to 6.5% (or about 30% for charcoal) and for m-xylene it drops from about 34% to 15% (or about 18% on charcoal). So a macroscopic support would typically not be considered for an ionic liquid in view of conversion. It is found important to further optimize reaction conditions. In other words the catalysts on a support would not be considered to be used.

In general most catalysts are used for synthesis of molecules and the like, not for degradation. Typically catalysts, and especially catalyst complexes, and function of a catalyst are sensitive to contaminants being present; in other words they function only properly under relative pure and clean conditions. As a result of contamination catalysts need to be replaced regularly, and extreme care is typically taken not to introduce contaminants. That may also be a reason why catalyst are typically not considered for degradation processes, as these processes almost inherently introduce contaminants.

In some instances metal catalysts are directly attached to a nanoparticle. Such catalysts are typically used for synthesis, but not for degradation, and certainly not for a reaction with at least one solid reactant. In this respect it is noted that for synthesis a reaction between two or more components is executed, wherein the two or more components are in close contact, such as in a solvent. The nature and relevant parameters of a synthesis reaction is considered to be quite different from degradation reactions; for instance relative low amounts of catalyst may be used and relatively high yield may be obtainable under optimal conditions. One can therefore not expect the teachings of synthesis reactions to be applicable in general to degradation reactions.

Reactions can take place in various types of reactors. In flow chemistry, a chemical reaction is run in a continuously flowing stream rather than in batch production. In other words, pumps move fluid into a tube, and where tubes join one another, the fluids contact one another. If these fluids are reactive, a reaction takes place. Flow chemistry is a well-established technique for use at a large scale when manufacturing large quantities of a given material. Often, microreactors are used.

Various patent documents and scientific documents recite fluids comprising magnetic particles.

Magnetic Fluids are a class of smart materials that change their properties reversibly and relatively fast (milli-seconds) under presence of an external magnetic field. These fluids can show changes in apparent viscosity of several orders of magnitude when a magnetic field is applied, such as a magnetic flux density in the order of around 1 T.

The present invention provides an improved method for degrading polymers typically present in a polymer material which overcomes at least one of the above disadvantages, without jeopardizing functionality and advantages.

SUMMARY OF THE INVENTION

The present invention relates in a first aspect to an improved method according to claim 1, showing partly major improvements over the prior art, e.g. in terms of selectivity (93% versus 59.2%), conversion, yield, a very low amount of catalyst used per amount of product degraded/obtained (0.2-18 wt. % versus 17-80 wt. % [weight catalyst/weight polymer]), use of energy (1 hour versus 4 hours; so also much quicker), insensitivity to contaminants, such as environmental substances, such as environmental substances, insensitivity to composition of raw material (i.e. the type of polymer to be degraded and the type of additive), etc. Put in numbers, the present invention provides a conversion of about 100%, a selectivity of significantly more than 90% (versus some 59.2% prior art), reuse of catalyst (over 50 times, being absent in prior art degradation processes), allowing any mixture of waste polymers (not known in the prior art, typically well cleaned, well separated, having one type/source of material, is needed for prior art processes), a relatively modest temperature and pressure may be used (200° C. versus e.g. 350° C.), etc. It is noted that the present catalyst complex shows an improved localized action. It is also noted that typically improvement in one aspect (parameter) involves a deterioration in another aspect (parameter); the present range of improvements in various aspects together is already in that sense surprising.

For various details of the present method and catalyst complex used therein reference is made to the International Applications PCT/NL2014/050418, and WO2014/142661 A2, filed by the same applicant, which contents are incorporated by reference.

The present catalyst complex comprises three distinguishable elements: a nanoparticle, a bridging moiety attached, such as by a covalent bond, to the nanoparticle and a catalyst entity (chemically, such as by a covalent bond) attached to the bridging moiety. The bridging moiety is solely in between the catalyst and the nanoparticle, respectively. The present complex is for instance different from a complex having a bridging moiety fully covering a nanoparticle, such as in a core-shell particle.

The present nanoparticle is of a magnetic nature. As such nanoparticles comprising a magnetic material are included, as well as particles that can be magnetized sufficiently under relative modest magnetic fields, such as being applied in the present method. The use of magnetic nanoparticles has the advantage that these may for instance be recovered by magnetic attraction after use. Suitably, the magnetic nanoparticles contain an oxide of iron, manganese and/or cobalt, or combinations thereof. Iron oxide, for instance but not exclusively in the form of $Fe_3O_4$ is preferred. Another suitable example is $CoFe_2O_4$.

It has been found that the nanoparticle should be sufficiently small for the catalyst complex to function as a catalyst, therewith degrading the present polymer into smaller units, wherein the yield of these smaller units, and specifically the monomers thereof, is high enough for commercial reasons. It is noted in this respect that a commercial value of waste polymers to be degraded is relatively small, i.e. a costs of degrading should be small as well. It has further been found that the nanoparticle should be sufficiently large in order to be able to reuse the present complex by recovering the present catalyst complex. It is economically unfavorable that the catalyst complex would be removed with either waste or degradation product obtained. Suitable nanoparticles have an average diameter of 2-500 nm. It is preferred to use nanoparticles comprising iron oxide. The catalyst entity, being selected, can then be attached to the present magnetic nanoparticles.

The present catalyst entity comprises at least two moieties. Such has been found to contribute to at least some of the present advantages. A first relates to an aromatic moiety having a positive charge (cation). A second relates to a moiety, typically a salt complex moiety, having a negative charge (anion). The negative and positive charge typically balance one and another. It has been found that the positively and negatively charged moieties have a synergistic and enhancing effect on the degradation process of the polymer in terms of conversion and selectivity, especially in view of degrading polyesters and polyethers.

The aromatic moiety preferably comprises a heterocycle, having at least one, preferably at least two nitrogen atoms, such as an imidazole, preferably butylmethylimidazolium ($bmim^+$), ethylimidazolium, or butylimidazolium ($bim^+$). The aromatic moiety preferably stabilizes a positive charge. The heterocycle may have 5 or 6 atoms, preferably 5 atoms. Typically the aromatic moiety carries a positive charge. If a nitrogen is present the charge is on the nitrogen.

The negatively charged moiety (anion) may relate to a salt complex moiety, preferably a metal salt complex moiety, having a two- or three-plus charged metal ion, such as $Fe^{3+}$, $Al^{3+}$, $Ca^{2+}$, and $Cu^{2+}$, and negatively charged counter-ions, such as halogenides, e.g. $Cl^-$, $F^-$, and $Br^-$. In an example the salt is an $Fe^{3+}$ comprising salt complex moiety, such as an halogenide, e.g. $FeCl_4^-$. Alternatively, use can be made of counter-ions without a metal salt complex, such as halides as known per se.

The present catalyst entity and nanoparticle are combined by a bridging moiety. The person skilled in the art would expect that binding a catalyst entity, such as one according to the invention, onto a support would jeopardize the functioning of the catalyst entity, at least to some extent. In this respect the present nanoparticle is not considered to be a support. Surprisingly, the present bridging molecule in combination with the nanoparticle provides a catalyst complex which functions almost as good as or better than the catalyst entity itself. For performance of the process in terms of conversion, selectivity, and economical feasibility the above needs to be taken into account; otherwise no effective degradation is obtained, e.g. in terms of conversion, selectivity, and economical feasibility. The present bridging moiety provides the above characteristics (in addition to the present nanoparticle). It is noted that up to now no economically viable process for polymer degradation has been provided.

In an example of the present catalyst complex the magnetic particles have an average diameter of 2 nm-500 nm, preferably from 3 nm-100 nm, more preferably from 4 nm-50 nm, such as from 5-10 nm. As indicated above, the particles are preferably not too large and not too small. It has been found that e.g. in terms of yield and recovery of catalyst complex a rather small size of particles of 5-10 nm is optimal. It is noted that the term "size" relates to an average diameter of particles, wherein an actual diameter of a particle may vary somewhat due to characteristics thereof. The size is determined per individual particle. In addition aggregates may be formed e.g. in the solution. These aggregates typically have sizes in a range of 50-200 nm, such as 80-150 nm, e.g. 100 nm. Particle sizes and a distribution thereof can be measured e.g. by light scattering, e.g. using a Malvern Dynamic light Scattering apparatus, such as a NS500 series. In a more laborious way, typically applied for smaller particle sizes and equally well applicable to large sizes representative EM-pictures are taken and the sizes of individual particles are measured on the picture. For an average a number weight average may be taken. In an approximation the average may be taken as the size with the highest number of particles or as a median size.

In an example of the present catalyst complex the bridging moiety is provided in an amount of (mole bridging moiety/gr magnetic particle) $5*10^{-6}$-0.1, preferably $1*10^{-5}$-0.01, more preferably $2*10^{-5}$-$10^{-3}$, such as $4*10^{-5}$-$10^{-4}$. Attached to each bridging moiety is typically a catalyst moiety, typically by a chemical covalent bond. The bridging moiety is also typically attached to the nanoparticle by a covalent bond. It is preferred to have a relatively large amount available in terms of e.g. yield, energy consumption, etc., whereas in terms of amount of catalyst and costs thereof a somewhat smaller amount is available, especially as the magnetic nanoparticles are considered as a relatively cheap part of the catalyst complex. Surprisingly the present method can be performed with very low amounts of catalyst complex, compared to prior art methods.

For the present method the solid polymer is provided in a suitable solvent. As such the present method may be considered as a solid-liquid degradation process supported by addition of a recoverable catalyst complex. For a glycolysis the solvent is preferably a mono- or di-alcohol, such as an alkanol or alkanediol, such as methanediol, ethanediol, and propanediol. As such the solvent also functions as a reactant. Inventors have found that in view of recovery of the present catalyst complex not all solvents are suited. Some solvents form a stable "dispersion" with the catalyst complex; in such a case in the step of recovery a second solvent, e.g. functioning as washing agent, may be provided and the catalyst complex may then be recovered using an electromagnetic field.

The method may be carried out batch-wise, continuous, semi-continuous, and combinations thereof. In one advantageous embodiment, the method comprises a first stage involving a pre-treatment and a second stage for full or substantial completion of the degradation reaction.

The first stage is preferably carried out so as to maximize heat transfer to any components in the reactor, i.e. polymer, solvent and catalyst complex, without giving rise to agglomeration. Said components are to be mixed to constitute a dispersion at elevated temperature. Preferably, use is made of a reactor provided with mixing means, such as a rotating mixer, that preferably is provided with mixing blades. Suitably, the reactor of the first stage is embodied to have a relatively short residence time, for instance less than 5 minutes, preferably at most 2 minutes.

In one embodiment, the heat is provided to the mixture by means of steam, preferably overheated steam. The steam may be led in a channel around the reactor vessel, so as to heat the reactor vessel. Alternatively, or additionally, the steam may be led through the reactor and/or through an inner tube inside the reactor. Since the reactor is to be heated to above 100° C., and preferably at a temperature and pressure at which the solvent remains liquid or could be boiling, liquefaction of the steam does not occur or occurs only to a limited extent. As a consequence, the steam may be separated from the dispersion and the dispersion is not diluted significantly.

The second stage is preferably carried out in one or more plug flow reactors, so as to enable a proper contact between the catalyst complex, the polymer and the solvent. In one preferred implementation, the plug flow reactor comprises a plurality of tube-shaped reactor elements, which are arranged in parallel. The number of reactor elements arranged in parallel is for instance in the range of 10-100, preferably 20-50. With this implementation, the wall of said tube-shaped reactor element may be used as a heating (or cooling) means, i.e. to maintain the desired temperature. Furthermore, the tube-shape is deemed beneficial for control of the pressure drop in the reactor, and therewith the residence time. Moreover, the subdivision of the heated dispersion into a plurality of tube-shaped reactor elements is deemed to ensure that the flow remains homogeneous.

According to a further aspect, the invention relates to such a reactor system having a first stage and a second stage, wherein the second stage is configured for plug-flow reaction by means of a plurality of tube-shaped reactor elements. This reactor system is most suitable for the catalyst complex as described hereinabove and below, but may also be used for related catalyst complex, such as catalyst complexes with another nanoparticle than a magnetic nanoparticle. The invention further relates to the use of the reactor system of the invention for the degradation of the polymers, such as polyesters.

The present method has a less selective feedstock, as from virgin polymer (such as PET) to various other recovered sources may be provided. Also it provides a relatively low energy process. As a consequence polymer produced from the present degradation products is considered to be 'Green' produced, such as in a case of PET up to 25%.

The present method can be considered to involve a dispersion, comprising a solvent, a polymer to be degraded, and a catalyst complex. It is noted that in general it is difficult to obtain a (time) stable dispersion. In this respect the present method distinguishes itself from a reaction with a catalyst on a support, which effectively relates to a two-phase system, not being suitable for polymer degradation.

The temperature and pressure of the method may be adjusted. Typically a somewhat higher temperature is preferred in terms of reaction velocity; a lower temperature is preferred in terms of energy consumption. Likewise a higher pressure is somewhat preferred; in view of complexity of an installation a lower pressure is preferred, that is a pressure being about 100 kPa. It is an advantage of the present method that a relatively low temperature may be used, without jeopardizing yield. It is also an advantage that using relatively mild temperature and pressure conditions the present degradation can be carried out in a relative short time. Such provides e.g. a relative high throughput, a relatively smaller installation, and lower consumption of materials and energy.

It is a further advantage of the present method that the method is relatively insensitive (e.g. in terms of yield) for mixed polymers being provided. Mixed polymers can relate to a combination of two or more different types of polymers, such as different polyesters, such as PET, polyethylene furanoate (PEF), polytrimethylene terephthalate (PTT), and polybutylene terephthalate (PBT), to a combination of one type of polymer having different properties, such as color, thickness, origin, and combinations thereof. Also the method is relatively insensitive to contaminants, like additives being present in a polymeric composition, such as pigments, fillers, filters, are separated in the course of the degradation process. It is understood by the inventors, that the additives adhere to the catalyst complex. Particularly, the bridging moieties and catalyst entities jointly adhered to the nanopartidies appear to enable adsorption of hydrophobic colorants. After the degradation process, the catalyst complex may be re-generated, in that the additives are removed by washing. It was found in preliminary investigations that degradation treatments of several batches of polyester bottles may be carried out before a washing step is needed. Mixed material comprising e.g. a polyester, such as PET, and a further material, such as a polyolefin, such as PE, a silicone material, polyamides, etc. can also be processed. As such the present method is considered robust, to be used under relatively sub-optimal conditions, such as in a plant.

Compared to prior art methods a characteristic of the present method is that the catalyst complex is recovered. It is preferred to use the present catalyst complex in the present method.

Thereby the present invention provides a solution to at least one of the above mentioned problems. The various examples and embodiments of the present invention described in relation to one aspect of the invention, are also deemed to be applicable to another aspect.

Advantages of the present description are detailed throughout the description.

DETAILED DESCRIPTION OF THE INVENTION

The present invention relates in a first aspect to a method according to claim 1.

Within the present invention the term "polymer" typically relates to a polymer material or polymer product. In the present method the polymer product before processing has an average volume of $10^{-7}$-50 cm$^3$, preferably $5*10^{-6}$-5 cm$^3$, more preferably $5*10^{-5}$-0.5 cm$^3$, even more preferably $5*10^{-4}$-0.05 cm$^3$. Such may require an extra process step of reducing a size of polymer product provided, e.g. shredding PET-bottles and grinding. A simple way of preventing too large polymer product parts is by using an appropriate sieve having a required mesh size, or a sequence of sieves. It may be somewhat costly to pelletize or granulize polymer; in view thereof somewhat larger pellets or granules are preferred, or put different having a relative small surface/mass ratio. In view of e.g. yield and size of a plant smaller pellets or granules are preferred. However, in view of environmental and health issues pellets or granules are preferably not too small. It is noted that also polymer bottles as such may be provided, possibly shredded to some extent.

The polymer concentration is from 1-40 wt. %, preferably from 2-30 wt. %, more preferably from 5-25 wt. %, such as 10-20 wt. %. In view of use of catalyst a somewhat higher concentration is preferred. In view of degrading a somewhat lower concentration is preferred. The polymer is typically provided in solid form. Preferably the plastic comprising the polymer is fragmented into smaller pieces. It has been found that the present method and catalyst complex are also suited in methods wherein natural fibres are degraded into smaller parts and/or are re-cycled, such as seed fibers, leaf fibers, bast fibers, skin fibers, fruit fibers and stalk fibers, such as cotton, kapok, sisal, agave, hemp, ramie, rattan, vine, jute, kenaf, wood, paper, wool, flax, bamboo and grass.

The average residence time of the polymer in the reactor during which degrading is performed is from 30 sec.-3 hours, preferably 60 sec.-2 hours, more preferably 2 [min]-1 hours, such as 5 [min]-30 [min] The shorter periods possible are considered relative short, especially as compared to prior art processes. Depending on e.g. reactor size and boundary conditions longer or shorter periods may be used. For instance, a high pressure (500-3000 kPa) process at a temperatune of 150° C.-350° C. leads to very short degrading times, in the order of minutes. Such indicates that the present method, and catalyst complex used therein, provide a large degree of design freedom.

The reactor is selected from a (semi)continuous type, such as a continuous stirred tank reactor (CSTR), and a tube-like reactor, such as a loop reactor, a plug flow reactor, an oscillatory flow reactor, an N-unit loop reactor system, and a batch type, and combinations thereof.

In an example of the present method degrading of the polymer is performed in at least two stages, in the first stage the polymer is pre-treated, such as in a batch or (semi-)continuous mode, and in a second stage the degradation is completed, such as in a tube-like system. An example of pre-treatment is homogenizing the PET in the EG solution. Performing of the reaction in two stages provides the advantage of a higher yield, less harsh reaction conditions, prevention of optional clogging, etc. In the context of the present invention the term "stage" may refer to a process step, a reactor, a phase, and combinations thereof.

In an example of the present method an average residence time of the polymer in the second degradation stage is 10 sec.-60 min, preferably 30 sec.-30 min, i.e. relatively short.

In an example of the present method an average volumetric residence time (reactor volume/flow rate) of the polymer in de degradation step is 10 sec-60 min, preferably 30 sec.-30 [min]

In an example of the present method the catalyst complex is provided as a first flow and wherein the polymer is provided as a second flow, or wherein the catalyst complex and polymer are provided in one flow. Such offers a high degree of flexibility, e.g. in adjusting an amount of catalyst.

In an example of the present method the degrading is performed at a temperature of 50° C.-500° C., preferably 90° C.-350° C., more preferably 150° C.-250° C., even more preferably 170° C.-200° C., such as 180° C.-195° C., e.g. 185° C. and 190° C. The preferred range is considered to relate to a relative mild temperature, especially as compared to prior art processes which are performed at temperatures above 300° C. Even further, as the temperature applied is relatively mild, waste energy of an adjacent plant may be used for the present process. It is noted that the present catalyst complex has been found to be stable enough under the conditions mentioned, such as the above temperature. The present complex does not volatilize under the present conditions.

In an example of the present method the amount of catalyst complex is 0.1-35 wt. %, preferably 0.5-20 wt. %, more preferably 1-10 wt. %, even more preferably 2-7 wt.

%, relative to a total weight of polymer provided, such as (weight to weight) 1 ABC:15PET (:45 EG, ethylene glycol). If the amount of catalyst is higher a shorter reaction time was obtained, whereas at a lower amount longer reaction times were obtained. Depending on further boundary conditions one may vary the amount of catalyst. Here the amount of catalyst relates to the catalyst entity and bridging moiety, i.e. without nanoparticle.

The present capture complex may for instance be used in a ratio (weight to weight) of Complex:PET in a range of 1:5 to 1:500, such as 1:10-1:15. In addition the amount of e.g. ethylene glycol:PET may vary from 1:2 to 1:20, such as 1:3 to 1:5. The waste polymers may relate to a single type of polymer, such as PET, PEF, PA, etc., and also to a mixture thereof. It typically comprises 50-99.9 wt. % of a specific polymer, such as PET, the remainder being impurities, other polymers, other compounds, etc.

In an example of the present method the pressure is from 90 kPa-10.000 kPa, preferably 100 kPa-8.000 kPa, more preferably 200 kPa-2.000 kPa. Mild pressures in an example are an advantage over some prior art processes, which need to be performed at relatively high pressures, of e.g. 1000 kPa, often in combination with a high temperature.

In a selection of a combination of temperature and pressure a range of [T,P] from [180° C., 60 kPa] to [450° C., 8.200 kPa] may be chosen, preferably from [250° C., 420 kPa] to [400° C., 4.960 kPa], such as from [280° C., 790 kPa] to [350° C., 2.560 kPa]. For the combinations the degradation time is found to be from 1.5 hours @[180° C., 60 kPa] to about 20 seconds @[450° C., 8.250 kPa]. For safety reasons the degradation is best carried out at a temperature below 350° C. and below a pressure of 6.000 kPa, depending on the solvent.

In an example of the present method further comprises the step of recovering the catalyst attached to the magnetic particle using an electro-magnetic field gradient, preferably in a magnetic field of 0.1-5 T, preferably from 0.3-2 T, more preferably from 0.5-1.5 T, such as 0.8-1.3 T, e.g. 1 T. Likewise alternative separation techniques, such as filtering, centrifugation, etc. may be used. As such a relatively small magnetic field is found to be sufficient to recover the present catalyst complex. In view of e.g. reactor design such is advantageous. In an example water is provided, in order to separate the present complex from the present solvent. It has been found that it is much easier to remove the present complex from a water phase, than from the present solvent phase. By providing a suited catalyst complex, such as the present complex, the catalyst (complex) may be recovered. It has been found that typically 95% of the catalyst complex can be recovered, and often even 98-99%. As a consequence the present catalyst complex can be reused 20-100 times, thereby e.g. saving costs. It has been found that a recovered catalyst complex functions equally well compared to a fresh (non-used) complex.

In an example of the present method further comprises the step of recycling the catalyst complex. After recovery the present complex can be recycled to the present degradation process, or removed and e.g. stored for later use.

In an example of the present method further comprises the step of removing additives from the solvent, the additives being added to the polymer when these where produced, such as colorants, fillers, anti-oxidants, etc. The additives may for instance be removed after adding water and applying a magnetic field; in that case additives are effectively separated from a phase wherein further the present catalyst, oligomers (typically having 4-12 monomers), trimers and dimers may be present. Such is advantages as in principle these additives are at this stage not reused, whereas the degradation products are reused, possibly formed into novel polymer.

In addition freed additives from the polymer may be captured by other compounds, such as carbon black, especially in a further method step typically performed after completion of the degradation.

In an example of the present method further comprises the step of retrieving trimers, dimers, and/or monomers, preferably free of additives and contaminants, such as by chemical and/or physical separation, in one step, or in a combination of steps. In a first step of retrieving e.g. water may be added. Monomers and solvent may dissolve in water, whereas catalyst complex, additives, oligomers, trimers and dimers, especially under influence of an external magnetic field, will form a separate phase. The catalyst complex, additives, oligomers, trimers and dimers may be reintroduced in a first reaction step, wherein the polymer is degraded. In a second step of retrieving the monomers can be retrieved by providing e.g. water, and then "crystallizing". As such the degradation products are ready to be reused, in fact without a further need to e.g. purify these products.

In an example of the present method the polymer is a mixture of waste polymers, the mixture optionally comprising at least one of colored polymers. The present method is capable of handling waste polymers, and even further a mixture of polymers, e.g. having different characteristics, such as a different color. The yield of degradation has been found not to be influenced noticeably. It is noted that prior art methods at the most can only handle relatively pure waste polymer, and even then results are discouraging.

In a further step an active compound, such as carbon black, may be added to capture and remove remaining additives.

In an example of the present method the constituencs such as solvent, catalyst complex and polymer, form a one-phase system. Such has been found advantageous, especially in terms of yield obtained. Also in terms of reactor design such is advantageous.

In an example of the present method the polymer may selected from natural polymers, biobased polymers, biodegradable polymers, polymers formed (directly or indirectly) from fossil fuels, and combinations thereof. In an example the polymer is at least one of a polyester, a polyether, such as polyoxymehtylene (POM), polyethyleneglycol (PEG), polypropyleneglycol (PPG), polytetramethyleneglycol (PTMG),polyethylene oxide (POE), polypropylene oxide (PPO), polytetrahydrofuran (PTHF), and polytetramethyleneetherglycol (PTMEG), a polypeptide, a polyamide, a polyamine, a polycondensate, preferably a polyester, such as poly carboxylic ester, wherein the poly carboxylic ester is preferably selected from polyethylene terephthalate (PET), polyethylene furanoate (PEF), polybutylene terephthalate (PBT), polytrimethylene terephthalate (PTT), polyglycolic acid (PGA), polylactic acid (PLA), polycaprolactone (PCL), polyethylene adipate (PEA), polyhydroxyalkanoate (PHA), polyhy-droxybutyrate (PHB), polyethylene naphthalate (PEN), Poly(3-hydroxybutyrate-co-3-hydroxyvalerate) (PHBV), and a polycondensate of 4-hydroxybenzoic acid and 6-hydroxynaphthalene-2-carboxylic acid (VECTRAN). In other words a large variety of polymers may be degraded by the present method. Some adjustments may be necessary, e.g. in terms of catalyst used, temperature applied, solvent used, etc. The present method is best suited for degradation of polyesters and polyethers. In an example of the present method the solvent is a reactant, the reactant being capable of reacting with the polymer being degraded, and preferably forming a mono- or di-ester with the monomer, such as an alkanol and alkanediol, preferably methanediol, ethanediol, and propanediol, water, and amino comprising reactants. In terms of e.g. reactor design and complexity of reaction such is an advantage. Further, a product obtained can e.g. in case of degradation of PET be directly used as feed-stock for PET production.

In an example of the present method further comprises the step of adjusting an amount of negative charged molecules (anions), such as by adding a salt, preferably a $Fe^{3+}$ comprising salt, such as an halogenide, such as by adding $FeCl_3$. Surprisingly the yield of the present method and the functioning of the catalyst complex can be maintained at a high level by adjusting an amount of the partly negatively charged molecules used. Such is step is relatively simple to carry out, and costs thereof are considered minimal.

In an example of the present method further comprises the step of providing oligomers to the solvent, preferably oligomers produced by the method. As such the oligomers may be degraded further, into dimers and monomers, in a subsequent step. The subsequent step may be carried out in the same place as an initial step, e.g. in the same reactor.

In an example of the present method the magnetic particles are at least one of ferromagnetic particles, antiferromagnetic particles, ferrimagnetic particles, synthetic magnetic particles, paramagnetic particles, superparamagnetic particles, such as particles comprising at least one of Fe, Co, Ni, Gd, Dy, Mn, Nd, Sm, and preferably at least one of O, B, C, N, such as iron oxide, such as ferrite, such as magnetite, hematite, and maghemite. In view of degradation yield magnetite and maghemite are preferred magnetic particles. In view of costs, even when fully or largely recovering the present catalyst complex, relatively cheap particles are preferred, such as particles comprising Fe.

In an example of the present method the bridging moiety is at least one of a weak organic acid, such as a carboxylic acid, such as a Cl-C18 carboxylic acid, silyl comprising groups, such as silylethers, such as triethoxysilylpropyl, and silanol. For a weak organic acid the Ka typically varies between $1.8 \times 10^{-16}$ and 55.5. It has been found that despite negative expectations these bridging groups do not result in a non-acceptable reduced performance of the catalyst entity. More particularly, the bridging moiety comprises a functional group for bonding to the nanoparticle and a second linking group to the catalyst entity. The functional group is one of the groups as specified hereinabove, such as a carboxylic acid or a silicic acid (i.e. silanol) group. The linking group is for instance an alkylene chain, with the alkylene chain typically between C2 and C10, for instance propylene.

The bridging moiety is preferably combined with the catalyst entity in the form of a reactant, in which the linking group is made reactive for chemical reaction with the catalyst entity, whereas the functional group may be protected. For instance, a suitable functionalization of the linking group is the provision as a substituted alkyl halide. A suitable protection of the functional group may be in the form of an ester or an alkoxysilane. The reactant is thus for instance provided in the form of a substituted alkyl halide, such as a trialkoxysilane-substituted alkyl halide, wherein the alkoxy is preferably methoxy or ethoxy and wherein the alkyl is suitably C1-C6 alkyl, for instance propyl or butyl. In this reaction, the alkyl-group will bond to a nitrogen-atom of the heterocyclic moiety, that gets positively charged in this manner. The halide forms the negatively charged counterion. The negatively charged halide may thereafter be strengthened by addition of a Lewis acid to form a metal salt complex. One example is the conversion of chloride to $FeCl_4^-$.

Examples of suitable reactants include 3-propylchloride trialkoxysilane, 3-propylbromide-trialkoxysilane, 2-propylchloride-trialkoxysilane, 2-propylbromide-trialkoxysilane. The alkoxy-group is preferably ethoxy, though methoxy or propoxy is not excluded. It is preferred to use trialkoxysilanes, though dialkyldialkoxysilanes and trialkylmonoalkoxysilanes are not excluded.

In an example of the present method the aromatic moiety has at least one tail. The present tail relates to a tail like moiety. The at least one tail preferably having a length of $C_1$-$C_6$, such as $C_2$-$C_4$, the at least one tail being attached to the at least one nitrogen atom. It has been found that for an optimal degradation a somewhat higher yield is obtained when the present tail is somewhat longer. In terms of mass of catalyst complex provided it has been found that a somewhat shorter tail is preferred.

In an example of the present method the magnetic nanoparticle comprises (per particle) at least one bridging moiety (B) and catalyst entity (C), preferably $2\text{-}10^4$ bridging moieties and catalyst entities (BC per particle), more preferably $10\text{-}10^3$ bridging moieties and catalyst entities (BC per particle). In principle, e.g. in view of yield, as many catalyst entities as possible may be provided. However the amount of catalyst entities and there functioning is in view of e.g. degradation efficiency somewhat smaller than an amount that could be achieved. Also when a larger particle is selected somewhat more catalyst entities may be present.

In an example of the present method the amount of bridging moiety and catalyst attached thereto is 0.03-99 wt. %, preferably 0.1-75 wt. %, more preferably 0.2-25 wt. %, even more preferably 0.3-10 wt. %, relative to a total weight of catalyst complex. Likewise as above, a relative low amount of 0.5-5 wt. % of catalyst entity has been found to be optimal, such as 0.6-3 wt. %, within further boundary conditions such as applied temperature. An amount of catalyst and/or bridging moiety may be determined by TGA. It is noted that the present catalyst and bridging moiety may form a single (mono-) layer, or a part thereof not fully covering the nanoparticle. Before applying the present catalyst complex in the present method it may be washed. The above weight percentages are relative to a total weight of catalyst complex.

In an example of the present method the polymer and solvent, and the catalyst complex, are provided at a temperature of 15-30° C., that is at ambient temperature. Thereafter, in an example in a first stage the temperature is increased to 170-200° C. as described e.g. above. Heat can be provided by high pressure steam. The first stage can be in batch or (semi)continuous mode. If two stages are used, in the second stage the temperature is maintained at 170-200° C. Heat can be provided by high pressure steam. The second stage can be in batch or (semi)continuous mode, such as a plug flow reactor. If one stage is used, the second stage is performed in the first reactor. In another example the polymer and solvent are heated to 170-200° C. for 1-8 hours. Thereafter the present catalyst complex is added, possible at a slightly lower temperature 150-200° C. and depolymerization is performed during 1-30 min. After completion of the reaction the mixture is cooled down to 50-75° C. The released heat is scavenged and reused in the process. At this temperature separation occurs. Thereto heated water is provided to the mixture. In an example a magnetic separation is applied, separating the present complex from the mixture. Other separation techniques may be used as well, such as filtration, and centrifugation. Thereafter the mixture is cooled down further to 0-15° C.; at this temperature crystallization occurs. The released heat is scavenged and reused in the process. Thereafter the oligomers, trimers, dimers and/or monomers are crystallized, and thereafter, optionally drying the obtained crystals, such as at a temperature of 40-75° C. Heat is provided, typically be reusing the heat scavenged. As an alternative the crystals may be dried in an excavator. As such the reaction products are obtained in relatively pure form, and typically the major reaction product is bis(2-hydroxyethyl terephthalate (BHET) (>90%).

In an example of the present method the polymer is polyethylene terephthalate (PET) or PEF, the solvent is ethanediol, the catalyst comprises butylmethylimidazolium ($bmim^+$), ethylimidazolium ($eim^+$), or butylimidazole ($biro^+$) and $FeCl_4^-$, the bridging moiety is derived from triethoxysilylpropyl chloride (forming a propyltrisilanol), and the nanoparticle is magnetite and/or maghemite. The nanoparticles preferably have a size of 5-10 nm. The bridging moiety preferably is present in an amount of $10^{-4}$-$10^{-2}$ mole bridging moiety/gr nanoparticle, such as $2*10^{-4}$-$10^{-3}$. It is assumed that if a predetermined amount (moles) of bridging moiety is attached to a predetermined amount (gr) practically all of the bridging moieties attach to the nanoparticle and substantially stay attached during the present method. Such is especially a preferred embodiment in view of the abundant amount of waste PET being available, being in excess of hundreds of thousand tons per year.

The invention is further detailed by the accompanying figures and examples, which are exemplary and explanatory of nature and are not limiting the scope of the invention. To the person skilled in the art it may be clear that many variants, being obvious or not, may be conceivable falling within the scope of protection, defined by the present claims.

SUMMARY OF FIGURES

FIG. 1a-e shows chemical reactions and catalyst complexes.

DETAILED DESCRIPTION OF FIGURES

FIG. 1a shows chemical reactions. Therein poly(ethylene terephthalate) is degraded by using (bmim)$FeCl_4$ in 1,2-ethanediol. Similar results have been obtained with bim and eim. As a result Terephtalic Acid Bis(2-Hydroxyethyl) ester (BHET) is formed. Further, it is shown that BHET can be convented into dimers and oligomers.

FIG. 1b shows a schematic representation of the present catalyst complex. Therein A represents a nanoparticle, such as maghemite, B a bridging moiety directly attached to the nanoparticle such as trisilanolpropyl, and C a catalyst entity, directly attached to the bridging moiety, with C1 being a positive catalyst moiety, such as bim, and C2 being a negative catalyst moiety, such as $Cl^-$. If present (hence not shown) a tail would extent away from the nanoparticle.

FIG. 1c shows a nanoparticle A surrounded by a number of bridging moieties and catalyst entities and attached to the nanoparticle.

Figure 1E:
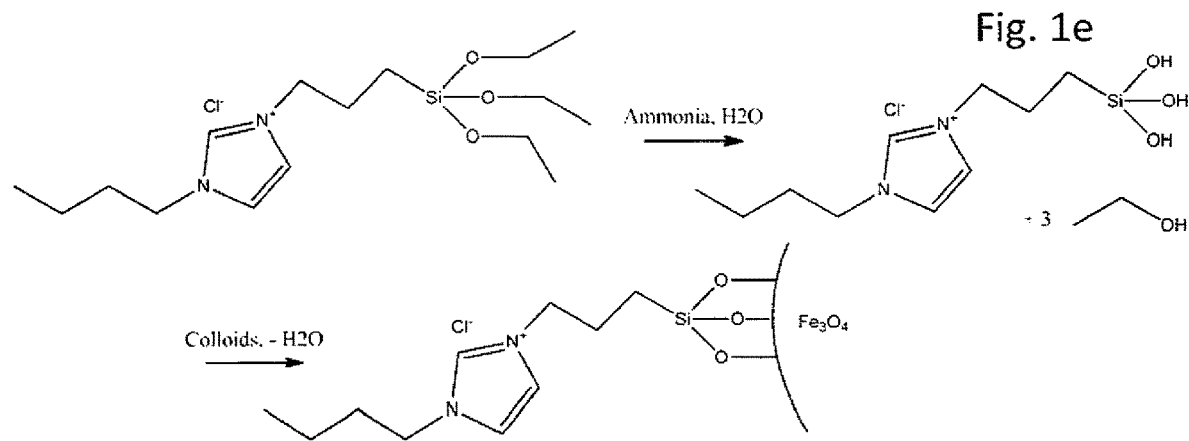

FIGS. 1d and 1e show reaction equations for formation of the capture complex of the invention in accordance with one preferred embodiment. In a first step (FIG. 1d) 3-chloropropyl-triethoxysilane is reacted over night with 1-butyl-imidazole under heating forming a BC sub-complex; herein the butyl may be referred to as a tail. A temperature is from 320-470 K, and depending on the temperature a reaction time is from 30 min. to overnight. The reaction yields almost 100% BC sub-complex. The resulting intermediate is the combination of positively charged N-[3-(triethoxysilyl)propyl]-butylimidazolium and negatively charged chloride. Subsequently, a Lewis acid, such as $FeCl_3$ may be added. However, that is not deemed necessary. In a second step, shown in FIG. 1e, the ethoxy-groups of the said reaction product thereof are converted to hydroxyl-groups, to result in a silanol-group. In a third step, that is for instance carried out in water or in ethanol or aqueous ethanol, the silanol is reacted with the nanoparticle surface, preferably in the presence of an acid. The resulting capture complex may thereafter be (re)dispersed in the desired solvent for the polymer degradation, for instance glycol.

It is noted that typically the bridging moiety comprises at one end thereof oxygen comprising entities, such as ethers, alcohols, and carboxylic acids. Typically these oxygen comprising groups, such as in the form of an alcohol, are grafted on the present nanoparticle under release of water. On another end of the bridging moiety typically at least one carbon is present, for carrying e.g. a halogenide.

Figure 2:
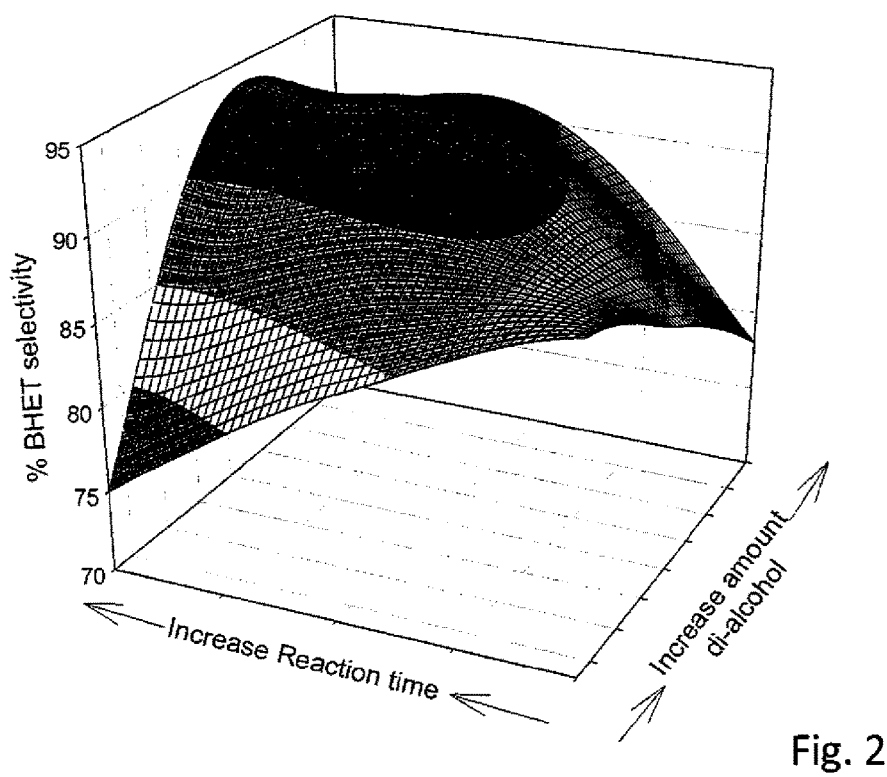
FIG. 2 shows selectivity percentages of BHET.

FIG. 2 shows selectivity percentages of BHET (vertical axis), obtained from depolymerization of colored PET, using a maghemite trisilanol bim complex with $cl^-$ anions, as function of reaction time and amount of di-alcohol (1,2-ethanediol) (horizontal axes). The PET provided was cut into pieces of about 2×2 $cm^2$. In another example pieces of about 0.3×0.3 $cm^2$, and in a further example as small particles having an average diameter of 50 μm. The size of the pieces was found to be not particularly relevant for the outcome. A reaction temperature was about 197° C. Results were obtained by varying a reaction time and amount of di-alcohol. For all degradation reactions performed, the corresponding PET conversion rates obtained are close to 100% (typically 99-99.99%, as no PET-pieces could be observed anymore in the solvent), which are considered to be very high. The selectivity rates (>90%, in a best case scenario so far >93%) are considered to be very high as well. The yield is as a result also >90%, and up to 93%. Even further the rates are obtained in a relatively short time frame. The selectivities are obtained with 2 wt. % catalyst (including bridging moiety and catalyst) relative to a total amount of polymer, respectively. So a small amount of catalyst is already sufficient.

So despite negative expectations that use of a catalyst complex would reduce selectivity, conversion and yield, the present method (and catalyst complex used therein) provides much better results e.g. in these respects than prior art methods (using a catalyst per se). Losses are already reduced from about 20-40% (prior art) to less than 7%.

Figure 3:
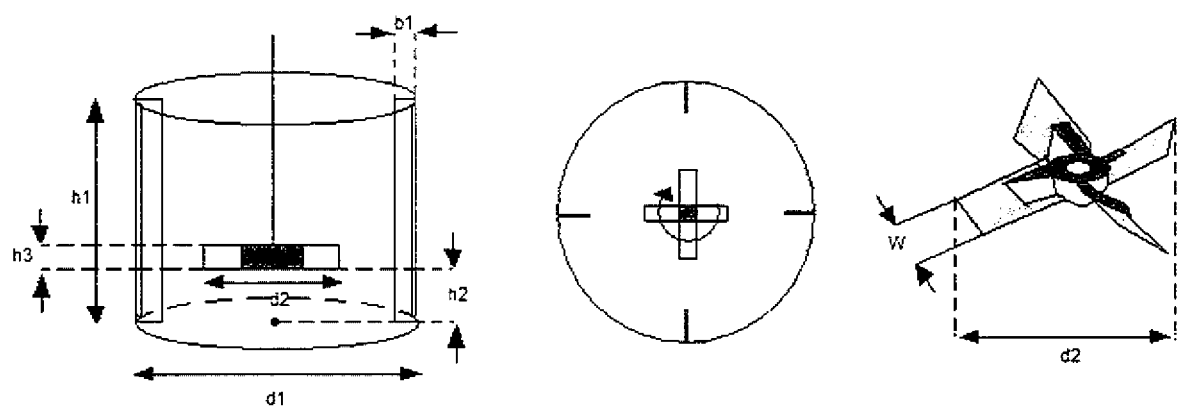
FIG. 3 shows a first reactor set-up (batch type).

FIG. 3 shows a batch reactor set-up for a production of about 30 ton BHET per day. A similar set-up exists for a (semi)continuous batch reactor. Therein in an example the solvent:polymer (e.g. ethylene glycol:PET) mass ratio is 10:1. In another example the ratio is 5:1, and in further example 3:1. The size of the reactor for a residence time of 1 minute is about 0.25 $m^3$, and for 30 [min] about 7 $m^3$. So a relatively small reactor and a somewhat larger reactor may be used. Both of them are taken to be cylindrical vessels having the following construction constraints:

d1:h1 = 0.5 (diameter versus height)
d2:d1 = 0.35 (mixer diameter versus diameter)

-continued

| | |
|---|---|
| h2:d1 = 0.25 | (height below mixer versus diameter) |
| h3:d2 = 0.2 | (height of mixer versus diameter of mixer) |
| W = d2/5 | (width of mixer blade versus diameter of mixer). |

Based on these constraint restrictions the following results for reactor design have been obtained:

| Technical Characteristic | Lower Value | Upper Value | Range |
|---|---|---|---|
| Volume, [m$^3$] | 0.2 | 6.0 | 0.1-10 |
| Diameter (d$_1$), [m] | 0.5 | 1.5 | 0.1-3 |
| Height (h$_1$), [m] | 1.0 | 3.5 | 0.5-5 |
| h$_2$, [m] | 0.125 | 0.525 | 0.1-1 |
| h$_3$, [m] | 0.035 | 0.105 | 0.01-0.5 |
| d$_2$, [m] | 0.125 | 0.375 | 0.1-0.5 |
| W, [m] | 0.0875 | 0.2625 | 0.05-0.5 |

Figure 4:
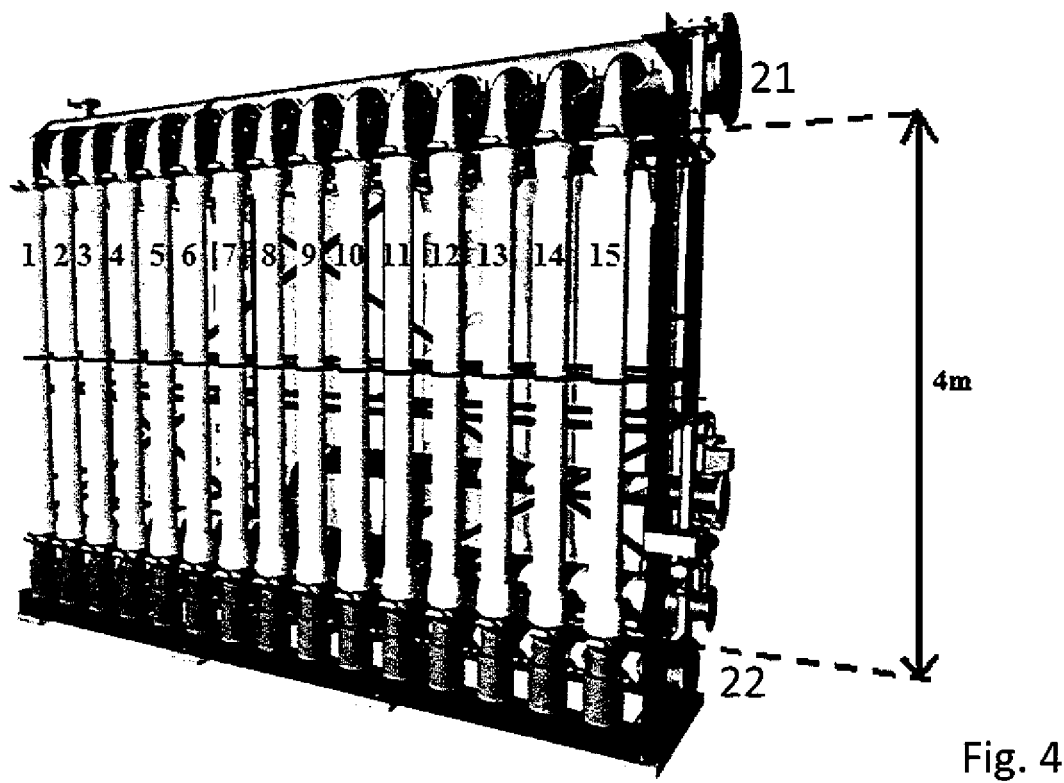
FIG. 4 shows a second reactor set-up (flow type).

FIG. 4 shows a tube-reactor set-up for a production of about 30 ton BHET per day. For construction thereof in an example carbon steel is used. A maximum pressure drop in the reactor is found to be 50 Pa/m. In a first design a tube diameter of 8 cm is chosen. The length of the reactor for a residence time of 1 minute is about 20 m, and for 30 [min] about 600 m. The minimum pressure drop is found be 10 Pa/m. In a second design a tube diameter of 25 cm is chosen. The length of the reactor for a residence time of 1 minute is about 2 m, and for 30 [min] about 60 m.

Based on these constraint restrictions the following results for reactor design have been obtained:

| Technical Characteristic | Lower Value | Upper Value | Range |
|---|---|---|---|
| Volume, [m$^3$] | 0.2 | 6.0 | 0.1-10 |
| Diameter (d$_1$), [m] | 0.08 | 0.25 | 0.05-0.5 |
| Length (h$_1$), [m] | 2.0 | 600 | 1-800 |

In order to build a relatively large reactor the design as shown in FIG. 4 is taken. On a top side the solvent/polymer (e.g. EG/PET) reaction mixture enters the reactor in an inlet 21. The mixture is distributed over parallel pipes 1-15, located at a front side, and similarly to 15 pipes located at a back side (not numbered). The length of the pipe is 4 m. After flowing through the pipes, and reacting, the obtained BHET exits the reactor at a bottom side through an outlet 22.

In view of heat transfer characteristics the shorter residence times (e.g. 1 min) can not fulfill the heat requirements or become unpractical in size. In view thereof the residence time should be (given a required throughput) a minimum of about 5 min, or put otherwise the reactor should have a bigger volume. A maximum residence time may be limited practically by a volume of the reactor smaller (e.g. 8 cm diameter reactor gives a length of >1000 m). In view hereof a tube diameter can be from 5-50 cm, and a (total) tube length of 1-800 m. The flow rate is preferably from 0.01 m/s-1 m/s.

In view of various characteristics of the batch-type and flow-type-reactor a combination of the two types provide advantages, such as increased throughput, yield, and reduced energy consumption, by in an example pre-heating and pre-processing in the batch-type (in a first stage), and finalizing the reaction at a temperature provided by the batch-reactor (in a second stage).

The reactor may further comprise at least one of a controller, such as a pressure controller, a temperature controller, a regulator, a valve, a pump, a heater, a cooler, and a sensor.

Both reactor set-ups shown in FIGS. 3 and 4 give similar results for yield etc. as mentioned above. The reactor set-ups also satisfy mass transfer demands, heat transfer demands, and provide adequate mixing, practical constraints, and reasonable flow rates, in view of e.g. temperature, pressure, residence time, and reactant boundary conditions. Despite the limitation still a relatively large degree of design freedom is found to be present.

EXAMPLES

Similar tests as above have been performed on non-colored PET. The results thereof are in the same order of magnitude for both conversion and selectivity. As a consequence inventors conclude that a colour additive has hardly any or no impact in this respect. Even further, additives, such as pigments, can be removed from the degradation products, with ease.

Similar tests as above have been performed on a wide range of raw (PET) material, e.g. polyester clothing, PET carpet, PET material from automotive industry, recycled PET, multi-layered PET trays containing other polymers, such as PE and PP. The results thereof are in the same order of magnitude for both conversion and selectivity, and thus for yield. As a consequence inventors conclude that the process is highly insensitive to different raw (PET) material and robust as well.

Similar tests were performed on amorphous (AMP) pellets and solid state polymerization (SSP) pellets. Again PET conversion and BHET selectivity were high. Values obtained for SSP pellets were somewhat lower, relatively. It is considered that possibly due to a somewhat longer chain length of the polymer to be degraded selectivity and conversion are somewhat jeopardized.

Further Examples

Examples Found of Degradable Polymers

Polyesters: PET, PEF, PTT, PLA, polycarbonate
Polyethers: cellulosis
Polyamides: nylon 6
Ionic liquids Tested:

An imidazolium based functional acid a piperidinium based functional acid, a pyridinium based functional acid, a pyrrolidinium based functional acid, a sulfonium based functional acid with an additional side group R3, an ammonium based functional acid with additional side groups R3 and R4, and a phosphonium based functional acid with additional side groups R3 and R4; all with at least side groups R1 and R2 and counter ion X—. X may be selected from F, Cl, Br, I, dicyanamide, bis(trifluoromethyisulphonyl)imide, preferably Cl.

The functional group R1 may be a (mono or multi, 1-4) carboxylic acid, whereas functional group R2 may be an alkane, typically a straight or branched alkane. Functional groups R3 and R4 may be selected from H, CH3 and R1 and R2. Functional groups R1-R4 have been selected independently and may be (partly) the same, or not. The side group R2 may have m or o carbon atoms may be branched, whereas the side group R1 having n (typically 4-20) carbon atoms is preferably straight.

So in summary aromatic and non-aromatic moieties had and have been tested, typically comprising a heteroatom (N, S, P), having a positive charge on the (or one of) hetero atom(s), and various side groups have been tested. The most promising have been claimed, namely the aromatic ones with a nitrogen atom.

Metal Salts:

Various metal salt comprising two- or three-plus charged metal ion and negatively charged counter-ions have been tested, especially Fe, Ca, Co, Mn, and the above counter ions.

Bridging Moiety:

For the bridging moiety weak and functionalize acids have been tested, such as a carboxylic acids and an oxysilane, such as methoxysilane or ethoxysilane.

Nanoparticles:

Various nanoparticles have been tested such as having O as counter ion, and Fe, Co and Mn as metal ion, and some combinations thereof. These function fine.

A size is typically relatively small, hence nanopartidies, with a lower value of 2 nm, and an upper value of 500 nm. Both have certain minor advantages and disadvantages.

Temperature:

Temperatures in the range of 50° C.-500° C. have been found suitable; above about 250° C. pressure needs to be applied.

Pressure:

Pressure from approximately atmospheric to a few bars have been found suitable.

Amount of Catalyst:

The amount of catalyst has been tested in a range of 0.1-35 wt. %, relative to a total weight of polymer provided, wherein the lower end of the range is considered to be relatively slow, but still applicable for certain applications, and the higher relatively costly.

Process Time:

Process time varies as a consequence of variations in other parameters; it is studied as such. Reactions are performed up to completion.

Solvent:

The solvent may be any solvent. Good results are obtained with water and alcohols as solvents, in combination with a mono- or di-alcohol. It is preferred to use the alcohol as claimed.

Reuse of Catalyst:

It has been found that the catalyst can be reused 20-50 times (or more), without significant loss in yield or performance (e.g. less than 1% less yield after 30 times).

Recovering Catalyst:

Most or all of the catalyst can be recovered easily, depending on the method of recovery. After 30 times recovery the amount recovered using magnetic recovery is higher than 98% of the initial amount, so virtually no losses. If filtration is used even higher amounts can be recovered.

Method of degrading a homo or copolymer into oligomers, trimers, dimers and/or monomers, comprising the steps of, providing the polymer in a suitable solvent, wherein the polymer [see table, row 1-3] is one or more of a polyester, a polyamide, a polycondensate, and a polyether, wherein the solvent is a mono- or di-alcohol, the polymer being in solid form, adjusting temperature and pressure to reaction conditions, wherein the degrading is performed at a temperature of 50*C-500° C. [see table, row 4-6], wherein the pressure is from 90 kPa-10.000 kPa, providing a catalyst complex comprising a catalyst entity [see table, row 7-8], a magnetic particle, and a bridging moiety solely between the catalyst entity and the magnetic nanoparticle, the catalyst complex being capable of degrading a polyester or polyether polymer into oligomers, trimers, dirers and/or monomers, wherein the catalyst entity is selected from both partly positive and partly negative charged moieties, wherein the positive charge is or and aromatic heterocycle moiety with at leas: one nitrogen etc, and wherein the negative charge is on a metal salt complex moiety having a two- or three-plus charged metal ion or negatively charged counter-ion, wherein the magnetic particles have an average diameter of 2 nm-500 nm [see table, row 9-10], wherein the magnetic particles comprise iron oxide [see table, row 11-12], wherein the bridging moiety is one or more of a weak organic acid, silanol, silyl comprising groups, and silanol, and wherein the bridging moiety is present in an amount of 5*10-6-0.1 mole bridging moiety/gr magnetic particle, wherein the amount of catalyst is 0.1-35 wt. %, relative to a total weight of polymer provided [see table, row 13-15], degrading the polymer over a period sufficient to degrade a significant portion thereof, recovering the catalyst complex, and recycling the recovered catalyst complex [see table, row 16]

TABLE 1 process parameters of PET depolymerisation.

| Row | Parameter | Result |
| --- | --- | --- |
| 1. | Polymer: PET flake | PET to BHET conversion of 92.4% in 60 min |
| 2. | Polymer: PTT fiber | PTT to BHET conversion of 77.5% in 30 min |
| 3. | Polymer: PLA flake | All material was decomposed within 120 min |
| 4. | Temperature: 197° C. | PET to BHET conversion of 92.4% in 60 min |
| 5. | Temperature: 185° C. | PET to BHET conversion of 88.8% in 180 min |
| 6. | Temperature: 175° C. | PET to BHET conversion of 12.7% in 240 min |
| 7. | Catalyst entity: butyl imidazole | PET to BHET conversion of 92.4% in 60 min |
| 8. | Catalyst entity: 1,4-butyl methyl imidazole | PET to BHET conversion of 92.0% in 60 min |
| 9. | Size particles: 10 nm | PET to BHET conversion of 92.4% in 60 min |
| 10. | Size particles: 20 nm | PET to BHET conversion of 82.8% in 75 min |
| 11. | Iron oxide: iron oxide, $Fe_3O_4$ | PET to BHET conversion of 92.4% in 60 min |
| 12. | Iron oxide: cobalt ferrite, $CoFe_2O_4$ | PET to BHET conversion of 82.8% in 75 min |
| 13. | Concentration catalyst complex: 20 wt. % Catalyst entity only: 0.4 wt. % | PET to BHET conversion of 92.4% in 60 min |
| 14. | Concentration catalyst complex: 2 wt. % Catalyst entity only: 0.04 wt. % | PET to BHET conversion of 88.2% in 90 min |
| 15. | Concentration catalyst complex: 0.2 wt. % Catalyst entity only: 0.004 wt. % | PET to BHET conversion of 90.2% in 90 min |
| 16. | Recovered complex: 20 times | PET to BHET conversion with an average 92.9% over 20 subsequent cycles. |

Experiment 1: reference method (see Table 1, row 1, 4, 7, 9, 11, and 13)

Experiment 1 is taken as a reference for all other experiments that will be described in this report. The reference scale of a laboratory experiment is 50 g of ethylene glycol (EG) in a 100 mL flask. The reference mass ratio of the reaction is 1 g of dry catalyst complex particles: 5 g of PET: 50 g of EG. The reference catalyst complex comprises 5 nm magnetite nanoparticles, trisilanolpropyl as bridging moiety and as ionic liquid (bim)$FeCl_4$ or (bmim)$FeCl_4$). A reference reaction was executed as follows:

The catalyst complex dispersion was homogenised by shaking for 5 minutes by hand. The reference concentration of the catalyst complex dispersion is 10 wt. % of catalyst complex particles in ethylene glycol, thus 10 g of catalyst complex dispersion was taken from the stock dispersion. Subsequently, 41 g of EG was added and the liquids were shortly mixed by hand to homogenise the dispersion. Then, 5 g of PET flakes were added and the round bottom flask was placed in the heating set up. The heating was started and after 20 minutes, the reaction mixture had reached the reaction temperature. The reaction was followed in time by taking in-process-control samples to measure the concentration of BHET produced as a function of time. The concentration of BHET was determined with HPLC. The results of a reference reaction are listed in Table 2.

TABLE 2

Conversion of PET to BHET as a function of time for a reference PET depolymerisation reaction

| Time [min] | PET to BHET conversion [%] |
|---|---|
| 5 | 1.7 |
| 10 | 5.4 |
| 15 | 10.0 |
| 20 | 10.5 |
| 35 | 31.8 |
| 45 | 51.5 |
| 60 | 92.4 |

Experiment 2: type of polyester (see Table 1, row 1-3)

The experiment was executed as experiment 1, but instead of 5 g of PET flakes, 5 g of PTT fiber (experiment 2a) or 5 g of PLA flakes (experiment 2b) was added. The results are listed in Table 3.

TABLE 3

Conversion of a polyester to BHET

| Experiment | Material | Time [min] | PET to BHET conversion [%] |
|---|---|---|---|
| 1 | PET | 60 | 92.4 |
| 2a | PTT | 30 | 77.5 |
| 2b | PLA | 120 | All flakes decomposed |

Experiment 3: temperature (see Table 1, row 4-6)

The temperature was lowered to 185° C. (experiment 3b) and 175° C. (experiment 3a). The composition of the reaction mixture was equal to experiment 1. The results are listed in Table 4.

TABLE 4

Conversion of PET to BHET as a function of temperature

| Experiment | Temperature [° C.] | Reaction time [min] | PET to BHET conversion [%] |
|---|---|---|---|
| 3a | 175 | 240 | 12.7 |
| 3b | 185 | 180 | 88.8 |
| 1 | 197 | 60 | 92.4 |

Experiment 4: catalyst entity (see Table 1, row 7-8)

In the catalyst complex preparation, the catalyst entity and bridging moiety were replaced by butyl-methylimidazolium. The PET depolymerisation method was unchanged. The results are listed in Table 5.

TABLE 5

Conversion of PET to BHET by different catalyst entities

| Experiment | Catalyst entity | Reaction time [min] | PET to BHET conversion [%] |
|---|---|---|---|
| 1 | Butylpropyl imidazolium | 60 | 92.4 |
| 4 | butylmethyl imidazolium | 60 | 92.0 |

Experiment 5: nanoparticle oxide and particles size (see Table 1, row 9-12)

In the catalyst complex preparation, the nanoparticle was replaced by cobalt ferrite instead of magnetite. As a result, also the size of the particle increased on average from 10 nm to 22 nm. The PET depolymerisation method remained unchanged. The results are listed in Table 6.

TABLE 6

Conversion of PET to BHET by different functionalised nanoparticles

| Experiment | Nanoparticle | Average size [nm] | Reaction time [min] | PET to BHET conversion [%] |
|---|---|---|---|---|
| 1 | Magnetite | 10 | 60 | 92.4 |
| 5 | Cobalt ferrite | 22 | 75 | 82.8 |

Experiment 6: concentration of catalyst complex (see Table 1, row 13-15)

A lower concentration of the catalyst complex was used: instead of 20 wt. % relative to the weight of the polymer, now 2 wt. % (experiment 6a) and 0.2 wt. % experiment 6b) were used. The PET depolymerisation method remained unchanged. The results are list in Table 7.

TABLE 7

Conversion of PET to BHET as a function of catalyst complex concentration

| Experiment | Wt. % catalyst complex | Time [min] | PET to BHET conversion [%] |
|---|---|---|---|
| 1 | 20 | 60 | 92.4 |
| 6a | 2 | 90 | 88.2 |
| 6b | 0.2 | 90 | 90.2 |

Experiment 7: recyclability of the catalyst complex (see Table 1, row 16)

The recyclability of the catalyst complex was tested by recycling the catalyst complex 20 times. This was done by executing the reference PET depolymerisation method, cooling down the reaction mixture and separating the catalyst complex using a magnet. In this way, a catalyst complex-free supernatant remained, was decanted. The catalyst complex was redispersed in fresh EG such that the reference mass ratio was obtained and the reference method was repeated. This process was repeated such that the catalyst complex was used 20 times, thus recycled for 19 times. The average process yield was 92.9%.

Experiment 8: concentration of EG

The concentration of EG in the reaction mixture was changed with respect to the reference method of 1 catalyst complex: 5PET: 50EG to 1 catalyst complex: 5PET: 25 EG (experiment 8a) and 1 catalyst complex: 5PET: 100EG (experiment 8b). The amount of EG in the reaction mixture was kept constant, the amount of catalyst complex and PET were changed. The results are listed in Table 8.

TABLE 8

Conversion of PET to BHET as a function of EG concentration

| Experiment | Mass ratio | | | Reaction time [min] | PET to BHET conversion [%] |
| --- | --- | --- | --- | --- | --- |
| | catalyst complex | PET | EG | | |
| 8a | 1 | 5 | 25 | 75 | 91.2 |
| 1 | 1 | 5 | 50 | 60 | 92.4 |
| 8b | 1 | 5 | 100 | 120 | 75.0 |

Experiment 9: free ionic liquid vs. bound ionic liquid

Instead of the catalyst complex, the free catalyst entity was used, butyl imidazole. The catalyst entity solely was used in the same mass ratio, thus 1 catalyst entity:5 PET:50 EG (experiment 9a). In order to compare the performance of the free catalyst entity in a similar concentration on the catalyst complex as in the reference PET depolymerisation method, the mass ratio 0.02 catalyst entity:5 PET:50 EG (experiment 9b) was performed. The results are listed in Table 9. Note that experiment 9a effectively uses about 50 times more catalyst than experiment 1. When compensated for this ratio (experiment 9b) the reaction time is much longer (160 versus 60 minutes) and the yield is much lower (20%). The present catalyst complex is thus much more effective.

TABLE 9

Conversion of PET to BHET as a function of unbound catalyst entity concentration

| Experiment | Mass ratio | | | Reaction time [min] | PET to BHET conversion [%] |
| --- | --- | --- | --- | --- | --- |
| | Complex or entity only | PET | EG | | |
| 1 | 1 | 5 | 50 | 60 | 92.4 |
| 9a | 1 | 5 | 50 | 45 | 85.9 |
| 9b | 0.02 | 5 | 50 | 160 | 73.9 |

Experiment 10: preparation of a catalyst capture complex
Preparation of the linker-catalyst complex (bridge-catalyst)

An alkyl imidazole (bim) is mixed with a halogensilane (triethoxysilylpropoyl chloride) in a 1:1 molar ratio and stirred at a slightly elevated temperatures for 8 hours.

Preparation of the Catalyst Complex

The magnetite nanoparticles are prepared based on the method first described by Massart et al. in 1981:

An Fe(II) solution is mixed with a Fe(III) solution in a 1:2 molar ratio respectively. The iron oxide nanoparticles are formed by a co-precipitation reaction in basic medium while stirring. Subsequently, the resulting iron oxide particles are washed water and ethanol.

Next, an adequate amount of linker-catalyst complex diluted with ethanol is mixed well with the dispersion of iron oxide particles, after which ammonia added. The reaction mixture is stirred for 15 hours.

The particles are washed with acetone prior to redispersion in ethylene glycol.

Experiment 11

PET depolymerisations using the present flow system.

A. parameter settings

Temperature Initial Chemicals
 PET/EG premix >313° K. (>40° C.)
 Magnetic Fluid >313° K. (>40° C.)
Flow-Rate
 50 ml/min
 Residence Time
 5 minutes at 453° K. (180° C.)
Heat Up
 Mixture was heated from 313° K. (40° C.) to 453° K. (180° C.) in the coil and still had an average residence time of 5 minutes at 453° K (180° C.).

The depolymeriztaion was performed successfully. A fully pumpable dispersion of PET in EG was achieved. Also homogeneous mixing of Magnetic fluid and PET/EG premix was established. The experiment resulted in a safe setup that does not clog. The depolymerisation measured in the reaction using HPLC gave >90% yield, as usual.

It is noted that with HPLC one can determine the amount of BHET formed in the reaction.

Sampling

For sake of comparison sampling was performed at the beginning of the process, in the PET/EG premix, and at the end of the process when the liquid came out of the coil.

Results

Full PET to BHET conversion was achieved.

The invention although described in detailed explanatory context may be best understood in conjunction with the accompanying examples and figures.

It should be appreciated that for commercial application it may be preferable to use at least one variations of the present system, which would similar be to the ones disclosed in the present application and are within the spirit of the invention.

The invention claimed is:

1. Improved method of degrading a polymer being a homo or copolymer into oligomers, trimers, dimers and/or monomers, comprising the steps of
 providing the polymer in a suitable solvent in a reactor, the polymer being in solid form,
 providing a reusable catalyst complex being capable of degrading the polymer into oligomers and/or monomers,
 pre-treating the polymer wherein the polymer is homogenized in the ethylene glycol solvent, and wherein the polymer, solvent and catalyst complex are mixed to form a heated dispersion, said heated dispersion being at a temperature in the range of 150-250° C. and
 degrading the polymer over a period sufficient to degrade a significant portion thereof, wherein the solvent is a reactant, the reactant being capable of reacting with the polymer being degraded, and
 recovering the catalyst complex,
 characterized in that
 the polymer is supplied in the form of a product with an average volume of $10^{-7}$-50 $cm^3$,
 wherein a polymer concentration in the dispersion is from 1-30 wt. %,
 wherein an average residence time of the polymer in the reactor is from 30 sec.-3 hours,
 wherein the catalyst complex comprises a catalyst entity, a magnetic nanoparticle, and a bridging moiety solely between the catalyst entity and the magnetic nanoparticle, the catalyst complex being capable of degrading a polymer into oligomers, trimers, dimers and/or monomers, wherein the catalyst entity comprises an aromatic hetero-cycle moiety having a positive charge and a moiety having a negative charge, wherein the catalyst entity and bridging moiety are attached such as by a chemical covalent bond, and wherein the bridging moiety and nanoparticle are attached, such as by a covalent bond, wherein the magnetic particles have an average diameter of 2 nm-500 nm, and wherein the bridging moiety is present in an amount of $5*10^{-6}$-0.1 Mole bridging moiety/gr magnetic particle, and wherein the reactor is selected from a (semi)continuous type, such as a continuous stirred tank reactor (CSTR), and a tube-like reactor, such as a loop reactor, a plug flow reactor, an oscillatory flow reactor, an N-unit loop reactor system and a batch type, and combinations thereof.

2. Method according to claim 1, wherein the pre-treatment of the polymer is performed in a first stage and in a second stage the degradation is completed, said stages being performed in separate reactor vessels.

3. Method according to claim 2, wherein an average residence time of the polymer in the second degradation stage is 10 sec-60 min.

4. Method as claimed in claim 2, wherein the first stage is carried out in a vessel provided with a mixer.

5. Method as claimed in claim 2, wherein heat is provided in the first stage by means of steam.

6. Method as claimed in claim 2, wherein the second stage is carried out in a plug flow reactor.

7. Method as claimed in claim 6, wherein the plug flow reactor is embodied as a plurality of tubes arranged in parallel.

8. Method as claimed in claim 1, wherein the plastic comprising the polymer is reduced in size to arrive at the specified volume.

9. Method according to claim 1, comprising at least one of steps selected from:
recovering the catalyst attached to the magnetic particle preferably by using an electro-magnetic field gradient,
recycling the recovered catalyst complex,
removing additives from the solvent,
providing oligomers to the solvent, preferably oligomers produced by the method,
adjusting an amount of negative charged molecules, and
retrieving trimers, dimers, and/or monomers.

10. Method according to claim 1, wherein the polymer is a mixture of waste polymers.

11. Method according to claim 1, wherein the degradation is performed at a temperature of 170-200° C.

12. Method according to claim 1, wherein the aromatic hetero-cycle comprises at least one nitrogen atom.

13. Method as claimed in claim 1, wherein the bridging moiety further comprises a linking group, via which it is coupled to the aromatic heterocycle.

14. Method according to claim 2, wherein the polymer and solvent are provided at a temperature of 15-30° C.,
wherein in the first stage the temperature is increased to 170-200° C., and
wherein in the second stage the temperature is maintained at 170-200° C.

15. Method according to claim 1, wherein the polymer is polyethylene terephthalate (PET) or polyethylene furanoate (PEF), the solvent is ethylene glycol, the catalyst comprises or butylim-idazolium ($bim^-$) and $Cl^-$ or $FeCl_4^-$, the bridging moiety is triethoxysilylpropyl, the amount of catalyst is 0.1-20 wt. %, the degrading is performed at a temperature of 90° C.-250° C., and the nanoparticle is at least one of magnetite, hematite, and maghemite.

16. Method as claimed in claim 1, wherein the catalyst entity and bridging moiety are attached by a chemical covalent bond.

17. Method of claim 1, wherein the bridging moiety and nanoparticle are attached by a covalent bond.

* * * * *